Aug. 22, 1950     P. A. BAYLESS     2,519,814
EXTRACTOR BASKET COVER
Filed July 15, 1946     2 Sheets-Sheet 1
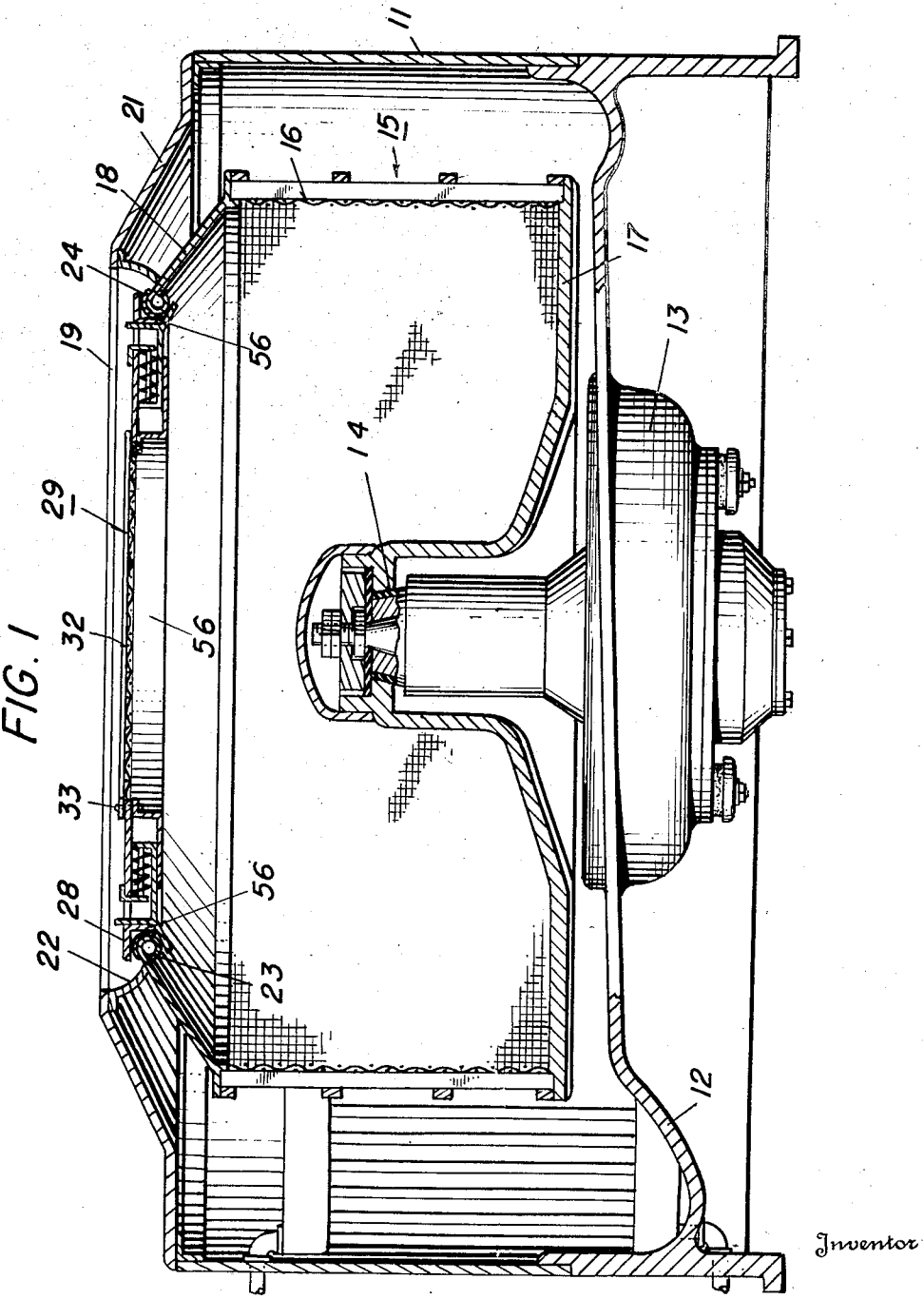
Inventor
PATRICK A. BAYLESS,

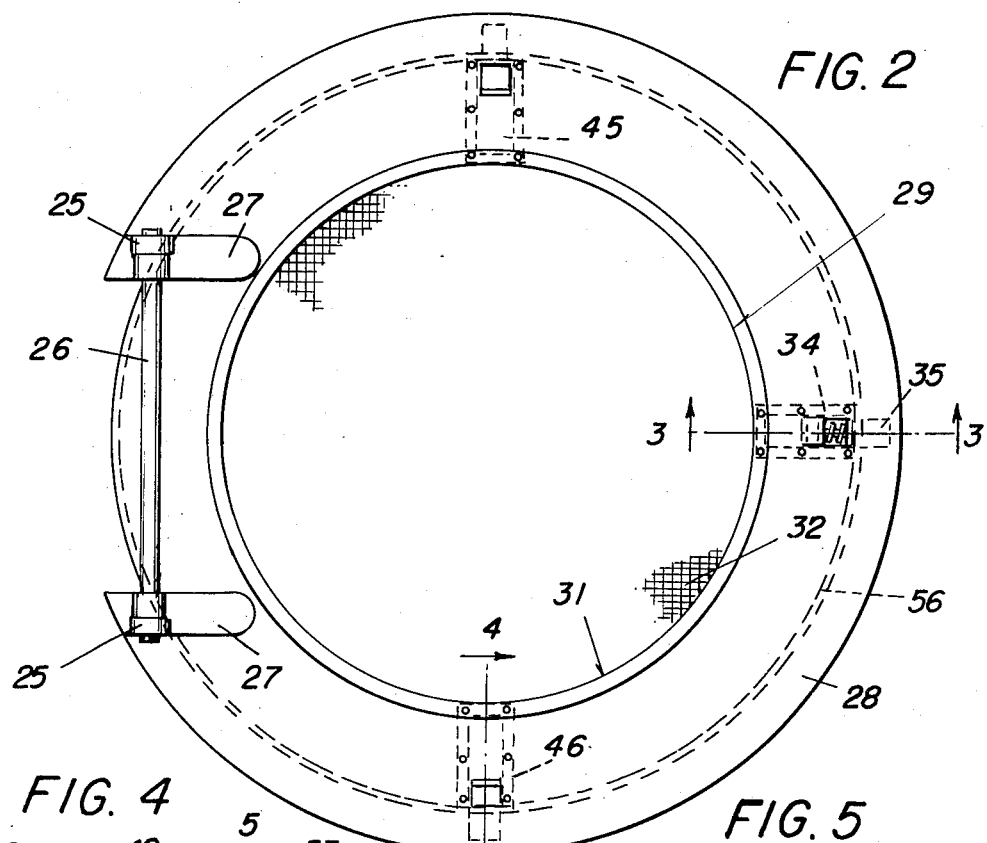
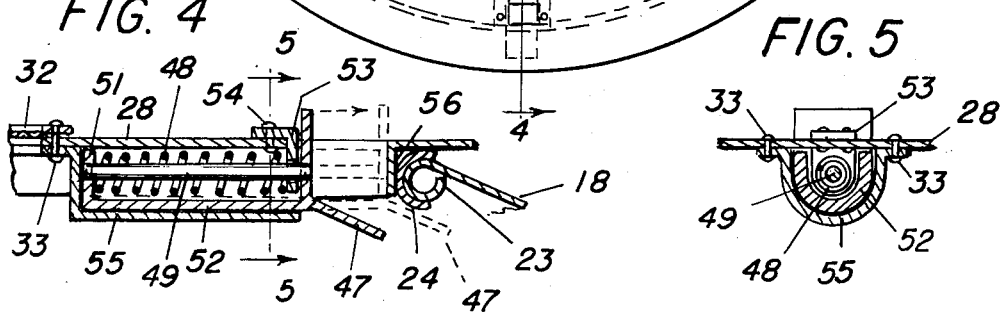
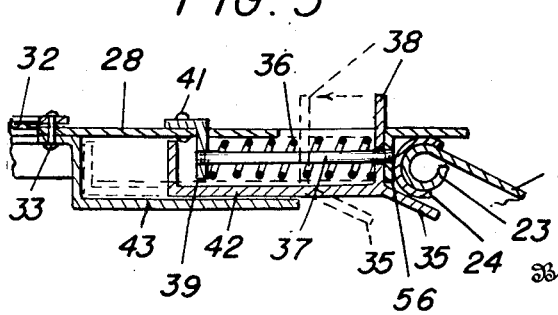

Patented Aug. 22, 1950

2,519,814

UNITED STATES PATENT OFFICE 2,519,814

EXTRACTOR BASKET COVER

Patrick Albert Bayless, Syracuse, N. Y.

Application July 15, 1946, Serial No. 683,661

8 Claims. (Cl. 210—63)

This invention relates to pneumodynamic and centrifugal extractors for separating liquids, moistures, vapors, residues, and odors from solids, and particularly concerns a cover for the extractor basket. This application is a continuation-in-part of my co-pending application Serial Number 455,945, now Patent No. 2,406,187, filed August 24, 1942.

The present device is applicable to many industrial fields such as the textile, dye, laundry, and dry cleaning fields; the removal of oil from metal turnings and chips, the extraction of juices or liquids from fruit and roots, and many similar uses too numerous to mention.

Heretofore, commercial extractors such as those used in laundries have consisted essentially of a cylindrical basket having perforated side walls to permit the water to escape from the material being dried as the basket is rotated at a high speed. This cylindrical basket rotates within a curb or housing which is also generally cylindrical in shape and is positioned concentric with the axis of the basket leaving a space between the basket and the curb. Both the basket and the curb have access openings in their upper ends through which material is passed into and out of the basket. The stationary curb may be provided with a hinged cover, but this permits material to enter the space between the access openings in the basket and the curb.

At present, operators of laundry and dry cleaning extractors place a piece of textile material, such as canvas, on top of the articles in the extractor basket. Then, using a wooden paddle, or his hands if the paddle is misplaced, he tucks the canvas cover under the rim of the basket surrounding the access opening. This consumes the operator's time and represents idle time for the extractor machinery. Also, it is frequently harmful to the operator's fingers and hands. Even though the canvas cover is porous, it retards the flow of air into the extractor basket and therefore prolongs the drying operation. This is particularly true when the cover is wet and is packed on top of articles already in the basket.

The basket must be evenly loaded and the canvas cover must be tucked evenly under the rim, or centrifugal force pulls the cover to one side, allowing articles to fly out of the basket and become wedged in the space between the basket and the curb. This results in more lost time and causes "extractor burns." The same thing may happen when the basket is overloaded, and centrifugal force throws articles out of the basket, causing expensive damage to garments and other articles in the machine.

Furthermore, as articles slip out of the rapidly rotating basket, they may injure the operator. The flying ends of articles moving at such high speed have frequently caused severe lacerations and burns.

A major object of the invention is to avoid these difficulties by providing a cover on the rotatable basket of the extractor rather than a cover on the stationary curb.

Another object of the invention is to provide a porous cover hinged to the rotatable basket of the extractor to facilitate the passage of air into the basket and thereby expedite the drying operation.

A further object of the invention is to provide a cover for the rotatable basket of the extractor, the top being rotatable in the basket opening and also hinged so it may be properly positioned to open out of the operator's way, regardless of the position in which the basket stops rotating.

A further object of the invention is to provide an extractor basket cover which automatically locks in closed position when the basket begins to turn.

According to my invention in its preferred form, one end of a cylindrical foraminous basket has an inwardly projecting flange, the inner periphery of which is turned upon itself to form a bead or rim surrounding a circular opening providing access to the basket. A circular ring rotatably slides on the rim so it may be manually turned relative to the basket. A foraminous basket cover is hingedly connected to the circular ring and is provided with a hand-operable latch, which may be released to open the cover. Two other latches are carried by the cover and these are centrifugally operated to automatically lock the cover closed to the basket when the basket is rotated.

In the accompanying drawings, a preferred form of my invention is shown, for purposes of illustration, in a pneumodynamic extractor of the type more fully described in my previously mentioned co-pending application, Serial Number 455,945. In these drawings—

Fig. 1 is a vertical section of an extractor showing an extractor basket and cover embodying the invention;

Fig. 2 is a top plan view of the basket cover shown in Fig. 1;

Fig. 3 is a longitudinal sectional view of a manually operated latch for the cover, taken on a line 3—3 of Fig. 2;

3

Fig. 4 is a longitudinal sectional view of a centrifugally operated latch for the cover, taken on a line 4—4 of Fig. 2;

Fig. 5 is a cross sectional view of the centrifugally operated latch, taken on the line 5—5 of Fig. 4.

The extractor shown in the drawings is of the pneumodynamic type and includes a cylindrical or volute curb 11 which receives extracted liquids and discharges them from the machine through drain channel 12. The base of the extractor carries a vibration-absorbing driving mechanism which is enclosed within housing 13 and which is more fully described in my co-pending application, Serial Number 682,446, filed July 9, 1946, for "Extractor Basket Drive." The vibration-absorbing driving mechanism has a resilient hub 14 which carries an extractor basket 15 having cylindrical foraminous side walls 16 and a solid lower end 17. The upper end of the basket is open and has an inwardly projecting flange 18, circular in shape but projecting slightly upwardly in the general form of a cone. The opening in the flange 18 is circular in shape and generally corresponds with an opening 19 formed in upper end 21 of the curb 11. As explained in my co-pending application, Serial Number 455,945, now Patent No. 2,406,187, a sealing ring 22 may be arranged between the curb and the flange 18 for the purpose of directing air inwardly through the opening in the basket to expedite the drying operation of materials carried by the rotatable extractor basket 15.

The inner periphery of the flange 18 is rolled upon itself, as indicated at 23, to form a bead or rim around the access opening of the basket. This rim 23 serves as a circular track to support a circular ring 24 having a concave outer peripheral surface which is fitted to and rotatable on the rim 23. The ring 24 is provided with hinge elements 25, 25 (Fig. 2) which receive a hinge pin 26, which in turn pivotally carries hinge members 27, 27 on a solid circular frame 28 of extractor basket cover 29.

The circular frame 28 carries within its inner periphery 31 a foraminous disc 32 secured to the cover frame as by rivets 33. The foraminous disc 32 is shown as being formed of wire screen material. The disc 32 thereby provides a complete cover for the basket but at the same time permits access of air and/or other fluids to the interior of the extractor basket. Particularly in the case of pneumodynamic extractors, which produce a rapid circulation of air through the material being extracted, the openings in the top of the extractor basket must permit the flow of a considerable quantity of air in order to dry materials with maximum efficiency.

The arrangement of the basket cover 29 hinged on rotatable ring 24 permits the operator to turn the cover and ring while the extractor basket is at rest so the cover may be properly positioned regardless of the position of the basket. Thus, the cover turns in the plane of the opening in the end of the cylindrical basket and then may be opened by a movement about hinge pin pivot 26 to permit free access through the opening in the basket.

The basket cover is normally locked in closed position by a single manually operable latch 34 which has a spring-pressed latch member 35 arranged to engage beneath ring 24 on the rim 23 of the basket. The latch member 35 is normally forced to its closed position by a compression spring 36 which surrounds a pin 37 and is arranged between projection 38 of the latch member and an abutment 39 secured as by rivet 41 to the cover frame 28. The latch member has a body portion 42 which slides within a housing 43 carried by the frame member 28 as by one of the rivets 33, which retains the wire mesh disc 32.

To open the cover, the operator pushes projection 38, thereby moving the latch member 35 to its dotted position, as shown in Fig. 3. This unlocks the latch member 35 with respect to ring member 24 and permits the cover to be opened by turning about hinge pin 26.

In order to assure rigid locking of the cover to the basket during rotation of the basket, a pair of centrifugally operated latches 45 and 46 are arranged on the circular frame 28 in diametrically opposite positions between the hinge and the manually operated latch 34.

As shown in detail in Fig. 4, the centrifugally operated latches have a latch member 47 which is normally retained in open position by a compression spring 48 surrounding a pin 49 extending between a projection 51 on body portion 52 of the latch member and an abutment 53 depending from circular frame member 28 and secured thereto as by rivet 54. The body portion 52 of the latch member slides in housing 55 which is secured, as by rivets 33, to the circular frame 28. As the basket and the cover being to rotate, centrifugal force, acting on the mass of the latch members 45 and 46, moves them toward the dotted position as shown in Fig. 4 so the latch member 47 engages beneath ring 24 on rim 23 of the basket. Thus, during the entire time that the basket is rotating, the cover is held in closed position by three latches. When the basket stops rotating, latches 45 and 46 are automatically unlocked due to the cessation of centrifugal force, so it is only necessary for the operator to release the manually operated latch 34 and open the basket.

A positive seal and guide 56, in the form of a circular lip projecting inwardly from the circular frame 28, prevents articles within the basket 15 from wedging between the circular ring 24 and the basket cover. Actually the lip 56 closely fits within the ring 24 and deflects any articles which may be thrown, by centrifugal force, toward the basket cover. The lip 56 deflects such articles downwardly into the basket and thus tends to more evenly distribute any articles which may become loosened due to uneven loading.

As stated at the outset, my invention provides a foraminous cover for the basket to replace the canvas covers heretofore used on the stationary curb. The particular cover which I have invented is easily positionable by turning relative to the basket so it may be opened in the proper direction irrespective of the position in which the basket stops. The cover has a foraminous portion which provides better circulation of air into the basket than was possible with textile covers heretofore used. Furthermore, safety features predominate in this basket cover by preventing damage to the articles within the basket or to the operator by the effect of centrifugal force in throwing articles from the basket. During rotation of the basket, the cover is triply locked through the action of centrifugal latches.

As many changes could be made in the specific construction described herein without departing from the invention defined in the appended claims, the above description and accompanying drawings are intended to illustrate one embodiment of the invention and should not be interpreted in a limiting sense.

What I claim is:

1. In an extractor, a cylindrical basket, the basket wall at one end being folded upon itself to form a smooth circular rim surrounding an opening, a ring fitted on said rim to turn about the opening, a cover plate hingedly connected to said ring and turnable therewith, and latching means for locking said cover plate closed on said ring.

2. In a centrifugal extractor, a cylindrical basket having an acces opening surrounded by a rim forming a circular track, an annular ring concentric with said opening secured on said track and turnable thereon about the axis of said opening, a cover hinged on said ring for closing said opening, said ring and cover being turnable as a unit relative to said basket, and latching means for locking said cover in closed position on said ring.

3. In a centrifugal extractor, a cylindrical basket having an access opening with the edge of the basket rolled into a bead forming a circular track surrounding said opening, an annular ring having its outer peripheral surface shaped to fit said bead to retain said ring thereon and permit turning movement of said ring about the axis of said opening, a basket cover hinged on said ring so it may be moved to and from a position closing said opening, and latching means for retaining said cover in closed position.

4. In a centrifugal extractor, a basket having an access opening with the edge of the basket rolled to form a rounded bead providing a circular track surrounding said opening, an annular ring having a concave outer peripheral surface fitted to said bead to retain said ring thereon and permit rotation of said ring about the axis of said opening, a basket cover hinged on said ring so it may be moved to and from a position closing said opening, and latching means for retaining said cover in closed position.

5. In an extractor, the apparatus defined in claim 1 wherein said latching means includes a centrifugally operated latch for automatically locking said cover.

6. In a centrifugal extractor, the apparatus defined in claim 2 wherein said latching means includes a centrifugally operated latch for automatically locking said cover in closed position.

7. In a centrifugal extractor, the apparatus defined in claim 3 wherein said latching means includes a centrifugally operated latch for retaining said cover in closed position.

8. In a centrifugal extractor, the apparatus defined in claim 4 wherein said latching means includes a centrifugally operated latch for retaining said cover in closed position.

PATRICK ALBERT BAYLESS.

REFERENCES CITED

The following references are of record in the file of this patent:

UNITED STATES PATENTS

| Number | Name | Date |
|---|---|---|
| 877,639 | Dittman | Jan. 28, 1908 |
| 1,299,866 | Smith | Apr. 8, 1919 |
| 1,678,938 | Dunsmore | July 31, 1928 |
| 1,747,293 | Geldhof | Feb. 18, 1930 |
| 1,871,402 | Balzer | Aug. 9, 1932 |
| 1,969,494 | Balzer | Aug. 7, 1934 |
| 2,235,467 | Vetorino et al. | Mar. 18, 1941 |